(12) United States Patent
Saito et al.

(10) Patent No.: US 10,574,171 B2
(45) Date of Patent: Feb. 25, 2020

(54) INDUCTIVE LOAD CONTROL DEVICE

(71) Applicants: Toshio Saito, Aichi (JP); Hiromi Murata, Aichi (JP)

(72) Inventors: Toshio Saito, Aichi (JP); Hiromi Murata, Aichi (JP)

(73) Assignee: OMRON AUTOMOTIVE ELECTRONICS CO., LTD., Aichi (JP)

(*) Notice: Subject to any disclaimer, the term of this patent is extended or adjusted under 35 U.S.C. 154(b) by 0 days.

(21) Appl. No.: 16/271,326

(22) Filed: Feb. 8, 2019

(65) Prior Publication Data
US 2019/0280638 A1 Sep. 12, 2019

(30) Foreign Application Priority Data

Mar. 6, 2018 (JP) .................................. 2018-039848

(51) Int. Cl.
| H02M 1/32 | (2007.01) |
| H02P 29/024 | (2016.01) |
| H02M 7/5387 | (2007.01) |
| H02M 1/08 | (2006.01) |
| H02P 27/08 | (2006.01) |

(Continued)

(52) U.S. Cl.
CPC ......... H02P 29/0241 (2016.02); H02H 7/122 (2013.01); H02H 7/18 (2013.01); H02M 1/08 (2013.01); H02M 1/32 (2013.01); H02M 7/53871 (2013.01); H02P 27/08 (2013.01)

(58) Field of Classification Search
CPC .......... H02M 1/08; H02M 1/088; H02M 1/32; H02M 7/5387; H02M 7/53871; H02P 27/06; H02P 27/08; H02P 29/02; H02P 29/024; H02P 29/2041
See application file for complete search history.

(56) References Cited

U.S. PATENT DOCUMENTS 8,884,559 B2 * 11/2014 Murata ................ B62D 5/0484
                                                            318/400.22
9,543,857 B2 * 1/2017 Murata ................. H02M 7/537
(Continued)

FOREIGN PATENT DOCUMENTS

| JP | 2012-065405 A | 3/2012 |
| JP | 2012-188101 A | 10/2012 |

(Continued)

Primary Examiner — Matthew V Nguyen
(74) Attorney, Agent, or Firm — Osha Liang LLP

(57) ABSTRACT

An inductive load control device includes: an electric path configured to connect an external DC power supply and an inductive load drive unit; an opening and closing unit configured to connect or disconnect the electric path; a voltage detection unit configured to detect a voltage difference between ends of the opening and closing unit; and a failure detection unit configured to detect a failure of the opening and closing unit. The opening and closing unit includes: series-connected first and second switching elements; and a diode connected in series with the first switching element and in parallel with the second switching element such that an anode of the diode is disposed in a direction of the DC power supply. The failure detection unit is configured to detect that the second switching element is in a non-conduction failure, based on the voltage difference.

10 Claims, 9 Drawing Sheets

(51) Int. Cl.
*H02H 7/18* (2006.01)
*H02H 7/122* (2006.01)

(56) References Cited

U.S. PATENT DOCUMENTS

| | | | | |
|---|---|---|---|---|
| 2011/0205672 A1 * | 8/2011 | Sakai | ................... | B62D 5/0487 |
| | | | | 361/18 |
| 2012/0212159 A1 | 8/2012 | Kitamoto | | |
| 2018/0294711 A1 * | 10/2018 | Yoshida | ................... | H02H 9/00 |

FOREIGN PATENT DOCUMENTS

| WO | WO-2004064235 A2 * | 7/2004 | ............ H02M 3/158 |
|---|---|---|---|
| WO | WO-2017122309 A1 * | 7/2017 | .............. H02P 27/06 |

* cited by examiner

INDUCTIVE LOAD CONTROL DEVICE

CROSS-REFERENCES TO RELATED APPLICATIONS

This application is based upon and claims the benefit of priority from Japanese Patent Application No. 2018-039848, filed on Mar. 6, 2018; the entire contents of which are incorporated herein by reference.

FIELD

One or more embodiments of the present invention relate to an inductive load control device, and more particularly, to an inductive load control device for detecting a failure of its own constituent element.

BACKGROUND

In the related art, regarding an inductive load control device connected to a DC power supply to control an inductive load such as a motor, means for detecting a failure of its own constituent elements such as a protection circuit at the time of reverse connection of the DC power supply is proposed. For example, JP-A-2012-065405 discloses a motor control device intended to diagnose whether or not reverse connection protection means for protecting a circuit included in the motor control device in a case where a power supply is reversely connected has failed. The motor control means includes reverse connection protection means which includes a switching element that connects or disconnects a battery and a motor and a backflow prevention element for preventing from backflow of a current when the battery is reversely connected, and failure diagnosis means for diagnosing failure of the reverse connection protection means. The failure diagnosis means calculates a difference between a cutoff potential difference before connecting the reverse connection protection means and a connection potential difference when connecting the reverse connection protection means and compares the calculated difference with a threshold value which is set in advance. When the difference is equal to or larger than the threshold value, it is determined that the reverse connection protection means has not failed, and when the difference is smaller than the threshold value, it is determined that the reverse connection protection means has failed.

JP-A-2012-188101 discloses a control device for an electric power steering apparatus which is intended to reliably detect a failure of a MOS-FET and can determine a failure of a parasitic diode even in a case where the MOS-FET is used for a power supply relay. In this electric power steering apparatus, MOS-FETs including a built-in parasitic diode and connected in series in a reverse direction and a capacitor located on an output side of a MOS-FET at the subsequent stage thereof are disposed in an energizing path between a battery and a motor drive circuit. In a state immediately after an ignition switch is turned on, the MOS-FETs are controlled to be turned on or off in a predetermined order, and a failure of the MOS-FET and the parasitic diode is detected based on an output voltage of each MOS-FET.

SUMMARY

One or more embodiments of the present invention provide an inductive load control device for detecting a non-conduction failure (also referred to as an off-failure) of a switching element in which diodes are provided in parallel in the switching element which is for reverse connection protection and used as a protection circuit when a DC power supply is reversely connected.

According to one aspect of the invention, there is provided an inductive load control device including: an electric path configured to connect an external DC power supply and an inductive load drive unit, the inductive load drive unit configured to supply a current from the DC power supply to an inductive load and drive the inductive load; an electric path opening and closing unit which is provided in the electric path and is configured to connect or disconnect the electric path; an electric path control unit configured to control opening and closing of the electric path opening and closing unit; a voltage detection unit configured to detect a voltage difference between a first voltage at one end of the electric path opening and closing unit on a DC power supply side and a second voltage at an other end of the electric path opening and closing unit on an inductive load drive unit side; and a failure detection unit configured to detect a failure of the electric path opening and closing unit, wherein the electric path opening and closing unit includes: a first switching element; a second switching element connected in series with the first switching element; and a diode connected in series with the first switching element and connected in parallel with the second switching element such that an anode of the diode is disposed in a direction of the DC power supply, and wherein the failure detection unit is configured to detect that the second switching element is in a non-conduction failure, based on the voltage difference.

With the configuration described above, it is possible to provide an inductive load control device capable of detecting a non-conduction failure of a switching element for reverse connection protection by detecting a voltage difference between both ends of the electric path opening and closing unit.

According to another aspect of the invention, there is provided an inductive load control device including: a power supply terminal connected to an external DC power supply; an inductive load drive unit configured to supply a current to an inductive load and drive the inductive load; an electric path configured to connect the power supply terminal and the inductive load drive unit; an electric path opening and closing unit which is provided in the electric path and is configured to connect or disconnect the electric path; an electric path control unit configured to control opening and closing of the electric path opening and closing unit; a voltage detection unit configured to detect a voltage difference between a first voltage that is a voltage between the electric path opening and closing unit and the power supply terminal and a second voltage that is a voltage between the electric path opening and closing unit and the inductive load drive unit; and a failure detection unit configured to detect a failure of the electric path opening and closing unit, and wherein the electric path opening and closing unit includes: a first switching element; a second switching element connected in series with the first switching element; and a diode connected in series with the first switching element and connected in parallel with the second switching element such that an anode of the diode is disposed in a direction of the power supply terminal, and wherein the failure detection unit is configured to detect that the second switching element is in a non-conduction failure, based on the voltage difference.

With the configuration described above, it is possible to provide an inductive load control device capable of detecting a non-conduction failure of a switching element for reverse connection protection by detecting the voltage difference between the first voltage between the electric path opening and closing unit and the power supply terminal and the second voltage between the electric path opening and closing unit and the inductive load drive portion.

The voltage detection unit may be configured to detect a first voltage difference between the first voltage and the second voltage when the electric path control unit performs control to make the first switching element and the second switching element conductive, and the failure detection unit may be configured to detect that the second switching element is in a non-conduction failure in a case where the first voltage difference is larger than a predetermined first threshold value.

With the configuration described above, it is possible to detect a non-conduction failure of the switching element for reverse connection protection when the DC power supply is connected and the electric path is made conductive.

Further, the inductive load drive unit may be a bridge circuit including a plurality of switching elements disposed to allow a regenerative current to flow from the inductive load side to the DC power supply, the voltage detection unit may be configured to detect a second voltage difference between the first voltage and the second voltage when the electric path control unit performs control to drive the inductive load drive unit by making the first switching element and the second switching element conductive, and the failure detection unit may be configured to detect that the second switching element is in a non-conduction failure in a case where the second voltage difference is larger than a predetermined second threshold value.

With the configuration described above, it is possible to detect a non-conduction failure of the switching element for reverse connection protection when a regenerative current flows toward the positive electrode side of the DC power supply.

Furthermore, the first threshold value may be larger than a value obtained by adding a voltage drop of the first switching element and a voltage drop of the second switching element, and may be smaller than a value obtained by adding the voltage drop of the first switching element and a forward voltage drop of the diode.

With the configuration described above, it is possible to reliably detect a non-conduction failure of the switching element for reverse connection protection when the DC power supply is connected and the electric path is made conductive.

Furthermore, the second threshold value may be set based on a voltage generated at the other end of the electric path opening and closing unit on the inductive load drive unit side, the voltage generated at the other end depending on a voltage generated by the inductive load in a case where the regenerative current does not flow to the DC power supply through the second switching element due to the non-conduction failure of the second switching element.

With the configuration described above, it is possible to reliably detect a non-conduction failure of the switching element for reverse connection protection when a regenerative current flows toward the positive electrode side of the DC power supply.

As described above, according to one or more embodiments of the present invention, it is possible to provide an inductive load control device for detecting a non-conduction failure (also referred to as an off-failure) of a switching element in which diodes are provided in parallel with the switching element which is for reverse connection protection and used as a protection circuit when a DC power supply is reversely connected.

DETAILED DESCRIPTION

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

One or more embodiments of the present invention relate to a technique for detecting a failure of a circuit for protecting a circuit or the like for driving an inductive load in a case where a DC power supply is reversely connected. One or more embodiments of the present invention will be described below with reference to the drawings.

First Embodiment

Figure 1:
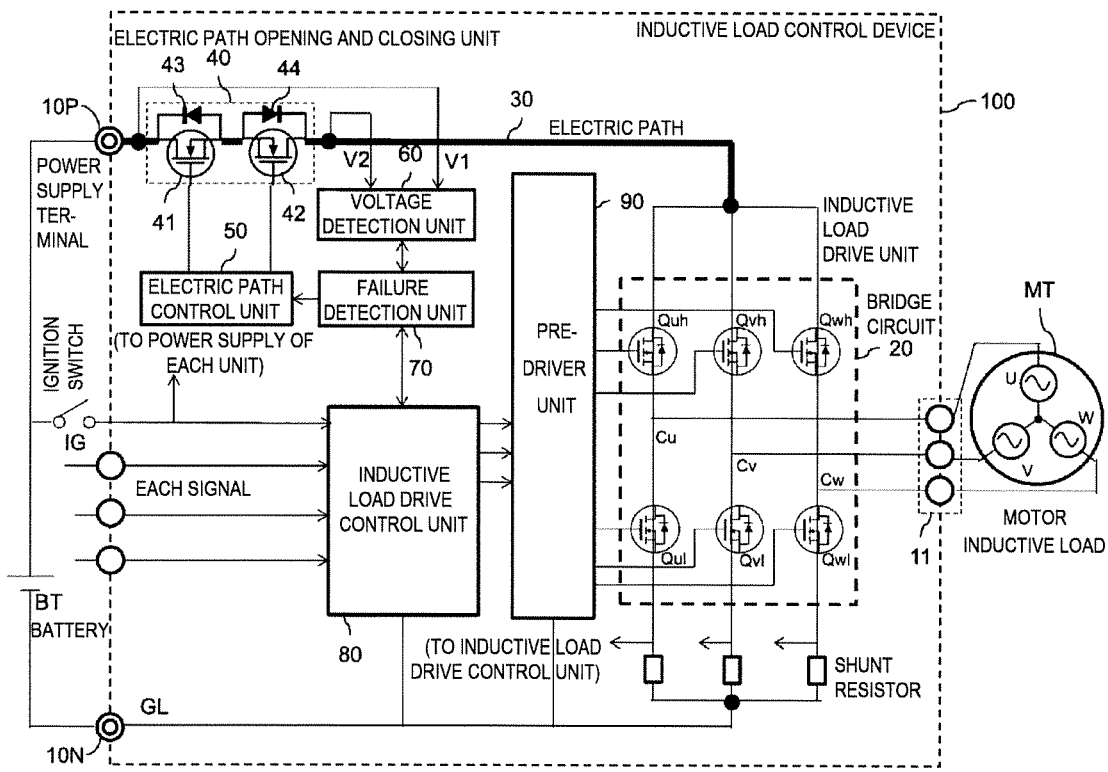
FIG. 1 is a block diagram illustrating an inductive load control device according to a first embodiment of the present invention.

With reference to FIG. 1, an inductive load control device 100 in this embodiment will be described. The inductive load control device 100 is a device which is provided between an external DC power supply BT and an inductive load and supplies electric power to the inductive load to drive the inductive load. The inductive load control device 100 includes an electric path opening and closing unit 40 which is a circuit for protecting an electric circuit for driving an inductive load in a state where the positive electrode and the negative electrode of the DC power supply BT are reversely connected. In this specification, the inductive load is described as a motor MT as a representative example thereof, but is not limited thereto, and refers to, for example, a load including windings such as a solenoid, a transformer, a relay coil, and the like. The inductive load control device 100 is used, for example, as an electric power steering device as an in-vehicle device.

The inductive load control device 100 includes a power supply terminal 10 (positive electrode side of the DC power supply BT is referred to as a power supply terminal Wand the negative electrode side is referred to as a power supply terminal 10N) connected to an external DC power supply BT, a bridge circuit 20 (inductive load drive unit) that supplies a current to the motor MT which is an inductive load and drives the motor MT, an electric path 30 connecting the power supply terminal 10P and the bridge circuit 20, an electric path opening and closing unit 40 provided in the electric path 30 for connecting or disconnecting the electric path 30, an electric path control unit 50 for controlling opening and closing of the electric path opening and closing unit 40, a voltage detection unit 60 for detecting a voltage difference between a first voltage V1 which is a voltage between the electric path opening and closing unit 40 and the power supply terminal 10P and a second voltage V2 which is a voltage between the electric path opening and closing unit 40 and the bridge circuit 20, a failure detection unit 70 for detecting a failure of the electric path opening and closing unit 40, an inductive load drive control unit 80 for controlling the entire inductive load control device 100, and a pre-driver unit 90 for actually driving a switching element in the bridge circuit 20 in response to an instruction from the inductive load drive control unit 80.

The power supply terminal 10P is a connection point with the positive electrode side of the DC power supply BT and has a structure that makes it easy to attach and detach the DC power supply BT at the time of replacing the DC power supply BT and maintenance of the inductive load control device 100. FIG. 1 illustrates a state (positive connection state) in which the polarity of the DC power supply BT is properly connected without error. The motor MT is a three-phase brushless motor used for a power steering device or a power sliding door (not illustrated) of a vehicle, and the like. For example, the motor MT is used to give an assist force to a steering operation or the like or to drive opening and closing of the sliding door. Since the motor MT is a three-phase motor, the inductive load control device 100 is connected to the motor MT at three motor connection points 11.

The bridge circuit 20 (inductive load drive unit) drives rotation of the motor MT which is an inductive load, and is directly connected to the motor connection points 11. The bridge circuit 20 is configured by connecting phase circuits Cu, Cv, and Cw that respectively correspond phases U, V, and W of the motor MT in parallel. The bridge circuit 20 is connected to the positive electrode side of the DC power supply BT through the high-side electric path 30 and is connected (grounded) to the negative electrode side of the DC power supply BT through a ground line GL and the power supply terminal 10N. The phase circuits Cu, Cv, and Cw of the bridge circuit 20 includes high potential side semiconductor switching elements Quh, Qvh, and Qwh provided on the high-side electric path 30 side and low potential side semiconductor switching elements Qul, Qvl, and Qwl provided on the ground line GL side, and shunt resistors provided on the ground line GL side in series, respectively. In this embodiment, as the high potential side semiconductor switching elements Quh, Qvh, and Qwh and the low potential side semiconductor switching elements Qul, Qvl, and Qwl, MOSFETs, that is, metal oxide semiconductor field effect transistors are used. Parasitic diodes are formed in the high potential side semiconductor switching elements Quh, Qvh, and Qwh and the low potential side semiconductor switching elements Qul, Qvl, and Qwl, which are the MOSFETs, respectively. The connection points of the high potential side semiconductor switching elements Quh, Qvh, and Qwh and the low potential side semiconductor switching elements Qul, Qvl, and Qwl are respectively connected to the phases U, V, and W of the motor MT through the motor connection points 11.

The pre-driver unit 90 is controlled by the inductive load drive control unit 80, outputs a pulse width modulation (PWM) signal to each phase of the bridge circuit 20, and drives the high potential side semiconductor switching devices Quh, Qvh, and Qwh and the low potential Side semiconductor switching elements Qul, Qvl, and Qwl to be turned on or off. With this configuration, the inductive load control device 100 rotationally drives the motor MT.

The inductive load drive control unit 80 calculates a duty ratio as appropriate based on a voltage value of each phase of the bridge circuit 20 and signals obtained from other sensors and an electric control unit (ECU) (not illustrated) and controls the pre-driver unit 90 to output PWM signals suitable for the duty ratio. These PWM signals are respectively input to gates of the driving semiconductor switching elements Quh to Qwl, and the bridge circuit 20 converts electric power of the DC power supply BT by PWM control and supplies the electric power to the motor MT. The signals obtained from other sensors or the ECU are a steering torque value of the steering wheel, a rotation angle of the motor MT, or the like, for example, in a case where the motor MT is used as an apparatus for giving assist force to the steering wheel. The inductive load drive control unit 80 is connected to the DC power supply BT through the ignition switch IG, and the inductive load control device 100 functions in a case where the ignition switch IG is turned on. Preferably, the inductive load drive control unit 80 is realized by using a microcomputer.

The electric path 30 is a high side electric path connecting the power supply terminal 10P connected to a normal positive side of the DC power supply BT and the bridge circuit 20. The electric path 30 has electric path opening and closing unit 40 on its electric path. The electric path opening and closing unit 40 connects or disconnects the electric path 30 by a switching element provided therein. The electric path opening and closing unit 40 includes a power shutoff FET 41 (first switching element) provided closer to the DC power supply BT, a reverse connection prevention FET 42 connected in series with the power shutoff FET 41 and provided closer to the bridge circuit 20, a power shutoff FET parasitic diode 43 connected in series with the reverse connection prevention FET 42 and connected in parallel with the power shutoff FET 41 so that the cathode of the power shutoff FET parasitic diode 43 is disposed in the direction of the DC power supply BT, and a reverse connection prevention FET parasitic diode 44 connected in series with the power shutoff FET 41 and connected in parallel with the reverse connection prevention FET 42 so that the anode of the reverse connection prevention FET parasitic diode 44 is disposed in the direction of the DC power supply BT. The electric path opening and closing unit 40 may be provided with a reverse connection prevention FET 42 on the side closer to the DC power supply BT.

The drain of the power shutoff FET 41 is connected to the power supply terminal 10P connected to the positive electrode of the DC power supply BT and the source of the power shutoff FET 41 is connected to the source of the reverse connection prevention FET 42 and the anode of the reverse connection prevention FET parasitic diode 44. The source of the reverse connection prevention FET 42 is connected to the source of the power shutoff FET 41 and the anode of the power shutoff FET parasitic diode 43, and the drain of the reverse connection prevention FET 42 is connected to the bridge circuit 20.

The cathode of the power shutoff FET parasitic diode 43 is connected to the power supply terminal 10P connected to the positive electrode of the DC power supply BT, the anode of the power shutoff FET parasitic diode 43 is connected to the source of the reverse connection prevention FET 42 and the anode of the reverse connection prevention FET parasitic diode 44. The anode of the reverse connection prevention FET parasitic diode 44 is connected to the source of the power shutoff FET 41 and the anode of the power shutoff FET parasitic diode 43, and the cathode of the reverse connection prevention FET parasitic diode 44 is connected to the bridge circuit 20.

The electric path control unit 50 is connected to the gate of the power shutoff FET 41 and the gate of the reverse connection prevention FET 42, and applies a drive signal to the gates so as to turn on or off the source-drain path of the power shutoff FET 41 and the reverse connection prevention FET 42, and controls opening and closing of the electric path opening and closing unit 40. The electric path control unit 50 controls opening and closing of the electric path opening and closing unit 40 based on a command signal from the failure detection unit 70 controlled by the inductive load drive control unit 80. When the ignition switch IG is turned on, electric power is supplied to the inductive load drive control unit 80, so that the inductive load control device 100 starts to function. Then, the inductive load drive control unit 80 performs control to turn on the power shutoff FET 41 and the reverse connection prevention FET 42. However, even if the ignition switch IG is turned on in a state where the DC power supply BT is connected in reverse, as electric power is not normally supplied to the inductive load drive control unit 80, control for turning on the power shutoff FET 41 and the reverse connection prevention FET 42 is not performed. As a result, the power shutoff FET 41 and the reverse connection prevention FET 42 are turned off. If the reverse connection prevention FET 42 is not provided, since a voltage is applied from the power supply terminal 10N to the power supply terminal 10P through the parasitic diode 43 of the power shutoff FET 41 in the inductive load control device 100, there is a possibility that the circuit may break down. However, due to the presence of the reverse connection prevention FET 42, the inductive load control device 100 is prevented from being applied with the voltage in the reverse direction.

The voltage detection unit 60 detects a voltage difference between the first voltage V1 which is the voltage between the electric path opening and closing unit 40 and the power supply terminal 10P and the second voltage V2 which is the voltage between the electric path opening and closing unit 40 and the bridge circuit 20. In other words, the voltage detection unit 60 detects a voltage difference between the first voltage V1 at one end of the electric path opening and closing unit 40 on the DC power supply BT side and the second voltage V2 at the other end of the electric path opening and closing unit 40 on the bridge circuit 20 side. That is, the voltage detection unit 60 detects a voltage difference between both ends of the electric path opening and closing unit 40.

Based on the voltage difference (|V1−V2|), the failure detection unit 70 detects that the reverse connection prevention FET 42 (second switching element) in the electric path opening and closing unit 40 is in a non-conduction failure. The non-conduction failure is also referred to as an off-failure, and refers to a failure in which the switching element remains off and does not conduct. In the non-conduction failure of the reverse connection prevention FET 42, it is assumed that the reverse connection prevention FET parasitic diode 44, which is a diode parasitic on the reverse connection prevention FET 42, is functioning normally. Preferably, the voltage detection unit 60 and the failure detection unit 70 are realized by a microcomputer including an A/D converter. The inductive load drive control unit 80 is shared by the same microcomputer and realized.

Figure 2A:
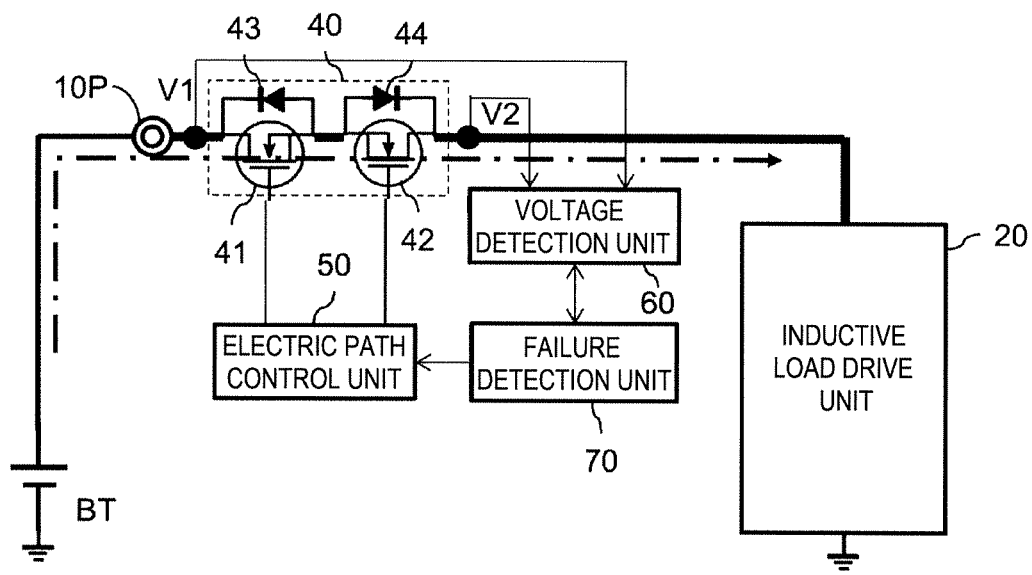
FIG. 2A is an explanatory diagram illustrating a flow of a current and FIG. 2B is an explanatory diagram illustrating a relationship between a first voltage and a second voltage, in a case where a normal operation is performed when a DC power supply is connected and an electric path is made conductive, in the inductive load control device according to the first embodiment of the present invention.
Figure 2B:
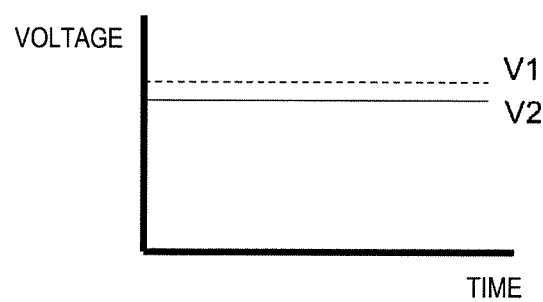
Figure 3A:
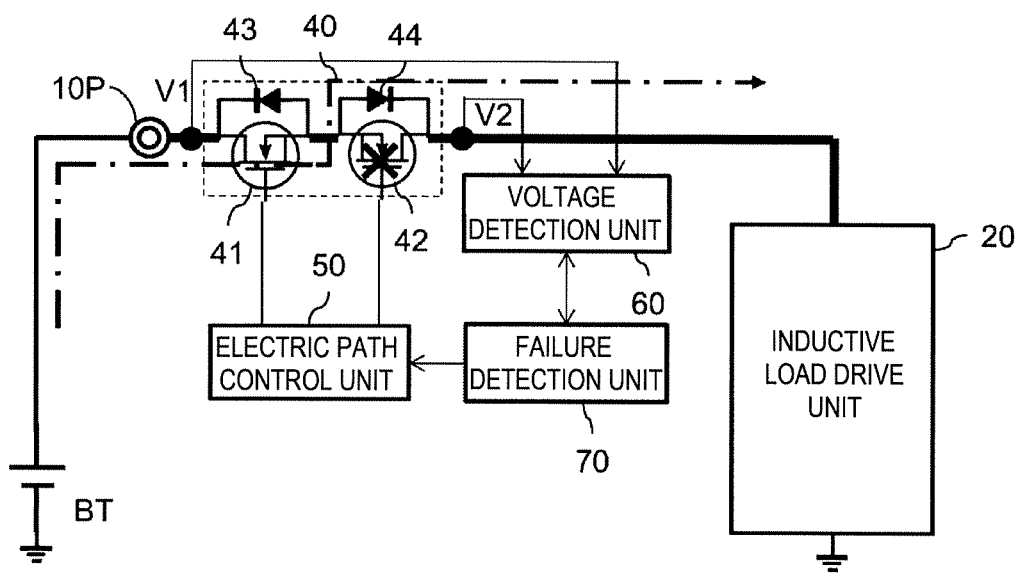
FIG. 3A is an explanatory diagram illustrating the flow of the current and FIG. 3B is an explanatory diagram illustrating a relationship between the first voltage and the second voltage, in a case where a non-conduction failure occurs in a reverse connection prevention FET when the DC power supply is connected and the electric path is made conductive, in the inductive load control device according to the first embodiment of the present invention.

With reference to FIGS. 2 and 3, description will be made on a relationship between the first voltage V1 and the second voltage V2 and a current flow, in a case where normal operation is in operation or a case where the non-conduction failure occurs in the reverse connection prevention FET 42 when the DC power supply BT is connected and the electric path 30 is made conductive. FIGS. 2A and 3A illustrate only a part related to the electric path opening and closing unit 40 and the failure detection unit 70 illustrated in FIG. 1 and the like.

FIG. 2A illustrates a state where the electric path control unit 50 controls the power shutoff FET 41 and the reverse connection prevention FET 42 to be turned on, that is, a state in which the electric path control unit 50 controls the electric path opening and closing unit 40 to be to turn on, when the electric path opening and closing unit 40 is operating normally. Also, the dashed line indicates the current. Since all elements in the electric path opening and closing unit 40, namely, the power shutoff FET 41, the reverse connection prevention FET 42, the power shutoff FET parasitic diode 43, and the reverse connection prevention FET parasitic diode 44 are normally operating, the current flows from the DC power supply BT to the inductive load drive unit 20 through the power shutoff FET 41 and the reverse connection prevention FET 42. When the first voltage V1 which is a voltage between the electric path opening and closing unit 40 and the power supply terminal 10P is compared with the second voltage V2 which is the voltage between the electric path opening and closing unit 40 and the bridge circuit 20, since the second voltage V2 is downstream of the first voltage V1, as illustrated in FIG. 2B, the second voltage V2 becomes lower than the first voltage V1 by the voltage drop between the drain and the source of the two FETs.

On the other hand, FIG. 3A illustrates a state where the electric path control unit 50 controls the power shutoff FET 41 and the reverse connection prevention FET 42 to be turned on when the elements other than the reverse connection prevention FET 42 are operating normally but the non-conduction failure occurs in the reverse connection prevention FET 42. Since the non-conduction failure occurs in the reverse connection prevention FET 42, the reverse connection prevention FET 42 remains off without being turned on even if the electric path control unit 50 controls the reverse connection prevention FET 42 to be turned on. However, since the reverse connection prevention FET parasitic diode 44 is in the forward direction with respect to a direction of the current, the current from the power shutoff FET 41 flows from the anode to the cathode of the reverse connection prevention FET parasitic diode 44 as illustrated by the dashed line.

Figure 3B:
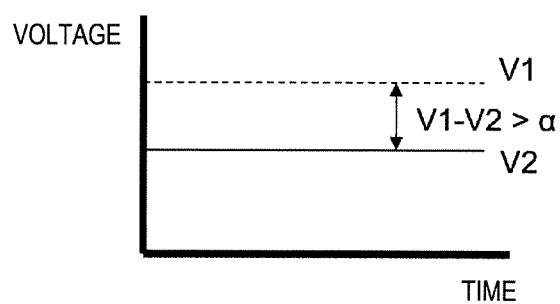

In such a state, when comparing the first voltage V1 and the second voltage V2, since the second voltage V2 is downstream of the first voltage V1, and a voltage drop of the reverse connection prevention FET parasitic diode 44 is larger than a voltage drop between the drain and the source of the reverse connection prevention FET 42, as illustrated in FIG. 3B, the second voltage V2 becomes smaller than that in the normal state, and a voltage difference (V1−V2) larger than that in the normal state occurs. Here, a value of a first threshold value α is set to a value which is smaller than a value obtained by adding the voltage drop between the drain and the source of the power shutoff FET 41 and the forward voltage drop of the reverse connection prevention FET parasitic diode 44 and which is larger than a value obtained by adding the voltage drop between the drain and the source of the power shutoff FET 41 and the voltage drop between the drain and the source of the reverse connection prevention FET 42. As illustrated in FIGS. 2A and 2B, when the electric path opening and closing unit 40 is operating normally, it becomes that $$V1-V2<\alpha \quad (1).$$

As illustrated in FIGS. 3A and 3B, in a case where the non-conduction failure occurs in the reverse connection prevention FET 42, it becomes that $$V1-V2>\alpha \quad (2).$$

As such, it is possible to detect a non-conduction failure of a reverse connection protection switching element by detecting the voltage difference (|V1−V2|) between the first voltage V1 between the electric path opening and closing unit 40 and the power supply terminal 10P and the second voltage V2 between the electric path opening and closing unit 40 and the inductive load drive unit 20, that is, the voltage difference (|V1−V2|) between both ends of the electric path opening and closing unit 40.

In the inductive load control device 100, when the electric path control unit 50 performs control to make the power shutoff FET 41 and the reverse connection prevention FET 42 conductive based on a command signal from the failure detection unit 70, the voltage detection unit 60 detects the voltage difference (V1−V2, first voltage difference) between the first voltage V1 and the second voltage V2. In a case where the voltage difference (V1−V2, first voltage difference) is larger than the first threshold value α which is set in advance based on the forward voltage drop of the reverse connection prevention FET parasitic diode 44, the failure detection unit 70 detects that the reverse connection prevention FET 42 is in a non-conductive failure. By detecting in this manner, it is possible to detect a non-conduction failure of the reverse connection prevention FET 42 (switching element for reverse contact protection) when the DC power supply BT is connected and the electric path 30 is made conductive.

With reference to FIGS. 4 and 5, description will be made on a relationship between the first voltage V1 and the second voltage V2 and a current flow when a regenerative current is about to flow from the inductive load drive unit 20 side toward the DC power supply BT and the normal operation is in operation and the non-conduction failure occurs in the reverse connection prevention FET 42. First, with reference to FIGS. 6 and 7, a regenerative current that can occur in the inductive load control device 100 will be described.

Figure 6:
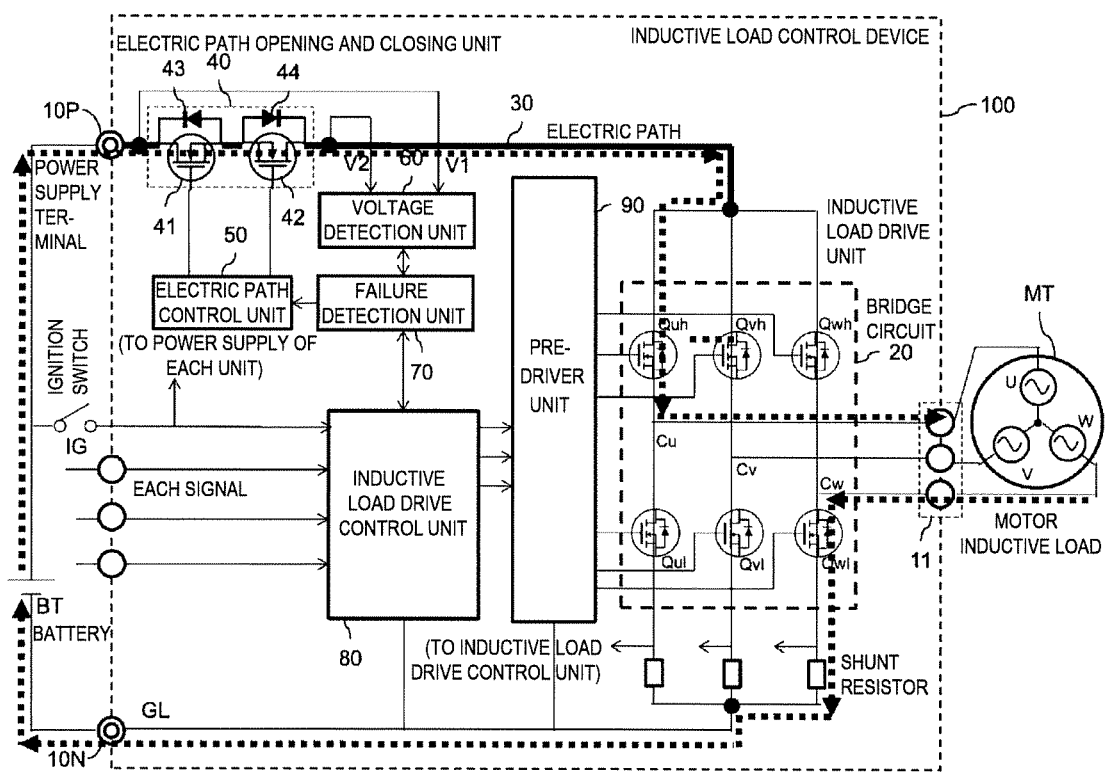
FIG. 6 is an explanatory diagram illustrating a flow of the regenerative current in a state where a motor is driven, in the inductive load control device according to the first embodiment of the present invention.

FIG. 6 illustrates a state where the inductive load control device 100 turns on the high potential side semiconductor switching element Quh and the low potential side semiconductor switching element Qwl to drive the motor MT using the electric power of the DC power supply BT. In this case, as indicated by a dotted arrow, the current for driving the motor MT flows from the positive electrode of the DC power supply BT to the U pole and the W pole of the motor MT through the power supply terminal 10P, the electric path opening and closing unit 40, the electric path 30, the high potential side semiconductor switching element Quh of the bridge circuit 20, and the connection terminal 11 of the U pole of the motor MT, and flows to return to the negative pole of the DC power supply BT through the connection terminal 11 of the W pole of the motor MT, the low potential side semiconductor switching element Qwl of the bridge circuit 20, the shunt resistor, the ground line GL, and the power supply terminal 10N.

Figure 7:
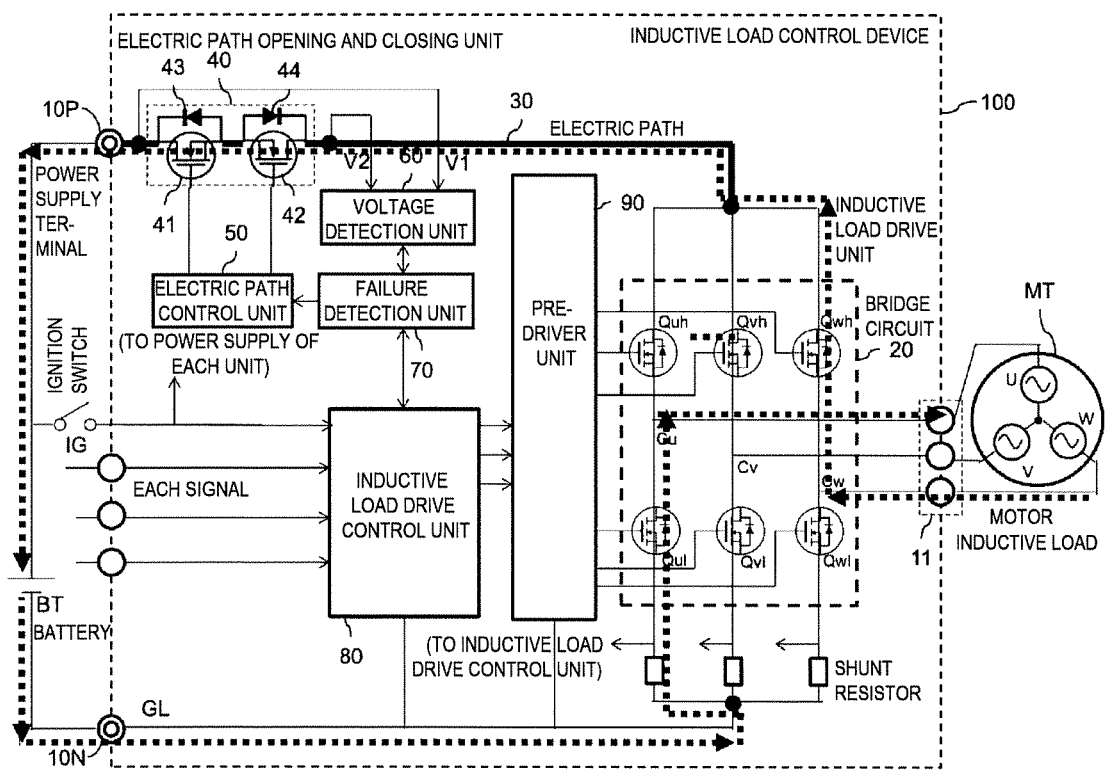
FIG. 7 is an explanatory diagram illustrating a state where switching elements of a bridge circuit are all turned off from the state of FIG. 6 and the regenerative current flows toward the DC power supply, in the inductive load control device according to the first embodiment of the present invention.

FIG. 7 illustrates a state where the switching elements of the bridge circuit 20 are all turned off from the state of FIG. 6 and a regenerative current flows toward the DC power supply BT. The regenerative current is a current flowing by counter electromotive force generated by the coil itself of the motor MT in a case where the current flowing in the motor MT is abruptly interrupted. For example, as described above, in a case where Quh and Qwl of the semiconductor switching element of the bridge circuit 20 are in an on state, a current flows from the DC power supply BT to the motor MT through the Quh and Qwl. Then, as illustrated in FIG. 7, when the Quh and Qwl are turned off and all the semiconductor switching elements in the bridge circuit 20 are turned off, the current supplied from the DC power supply BT to the motor MT is cut off. As a result, a counter electromotive voltage is generated in the coil of the motor MT, and a current (regenerative current) attempts to flow to the motor.

That is, as illustrated in the dashed line, this regenerative current flows from the negative electrode of the DC power supply BT to the W pole and U pole of the motor MT through the power supply terminal 10N, the ground line GL, the shunt resistor, the parasitic diode of the low potential side semiconductor switching element Qul of the bridge circuit 20, the connection terminal 11 of the U pole of the motor MT, and flows to return to the positive electrode of the DC power supply BT through the connection terminal 11 of the W pole of the motor MT, the parasitic diode of the high potential side semiconductor switching element Qwh of the bridge circuit 20, the electric path 30, the electric path opening and closing unit 40, and the power supply terminal 10P.

As in this embodiment, in a case where the inductive load is the motor MT, a force is externally applied to the output shaft of the motor MT, and the motor MT acts as a generator and generates a voltage. Even in such a case, a regenerative current may flow toward the DC power supply BT. For example, in the case of a motor MT used in an electric power steering apparatus, the motor MT is mechanically connected to a shaft that rotates a tire. For that reason, when the tire is rotated by an external force (road surface reaction force) received from a road surface during running of the vehicle, an output shaft of the motor MT is rotated by the external force and thus, the motor MT acts as a generator and generates a voltage. When a voltage value obtained by adding this voltage and the counter electromotive voltage generated when the motor MT is rotating due to the electric power from the DC power supply BT becomes larger than the voltage value of the DC power supply BT, a regenerative current may flow from the motor MT toward the DC power supply BT.

Figure 4A:
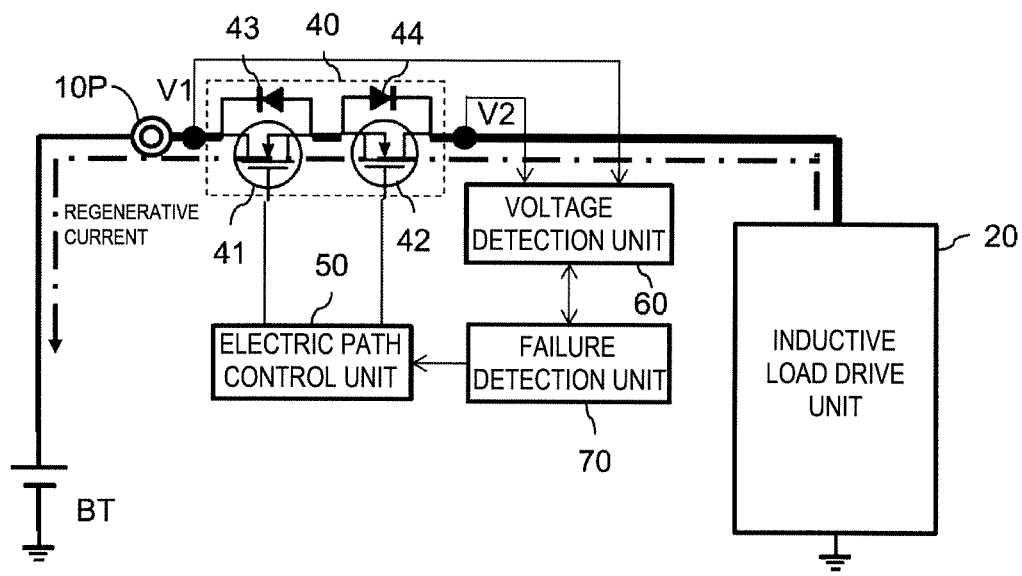
FIG. 4A is an explanatory diagram illustrating the flow of the current and FIG. 4B is an explanatory diagram illustrating a relationship between the first voltage and the second voltage, in a case where a normal operation is performed when a regenerative current flows, in the inductive load control device according to the first embodiment of the present invention.
Figure 4B:
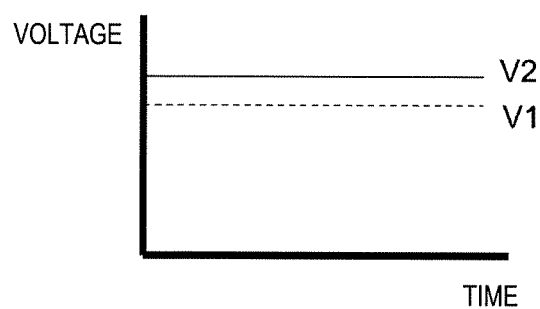

FIG. 4A illustrates a state where the electric path control unit 50 controls the power shutoff FET 41 and the reverse connection prevention FET 42 to be turned on when the regenerative current flows from the inductive load drive unit 20 side to the DC power supply BT in a case where the electric path opening and closing unit 40 is operating normally. Since all the elements in the electric path opening and closing unit 40 are operating normally, the regenerative current derived from the inductive load passes from the inductive load drive unit 20 which is the bridge circuit 20 through the reverse connection prevention FET 42 and the power shutoff FET 41 and toward the DC power supply BT. When the first voltage V1 which is the voltage between the electric path opening and closing unit 40 and the power supply terminal 10P is compared with the second voltage V2 which is the voltage between the electric path opening and closing unit 40 and the bridge circuit 20, since the first voltage V1 is downstream of the second voltage V2, as illustrated in FIG. 4B, the first voltage V1 is lower than the second voltage V2 by the voltage drop between the drain and the source of the two FETs.

Figure 5A:
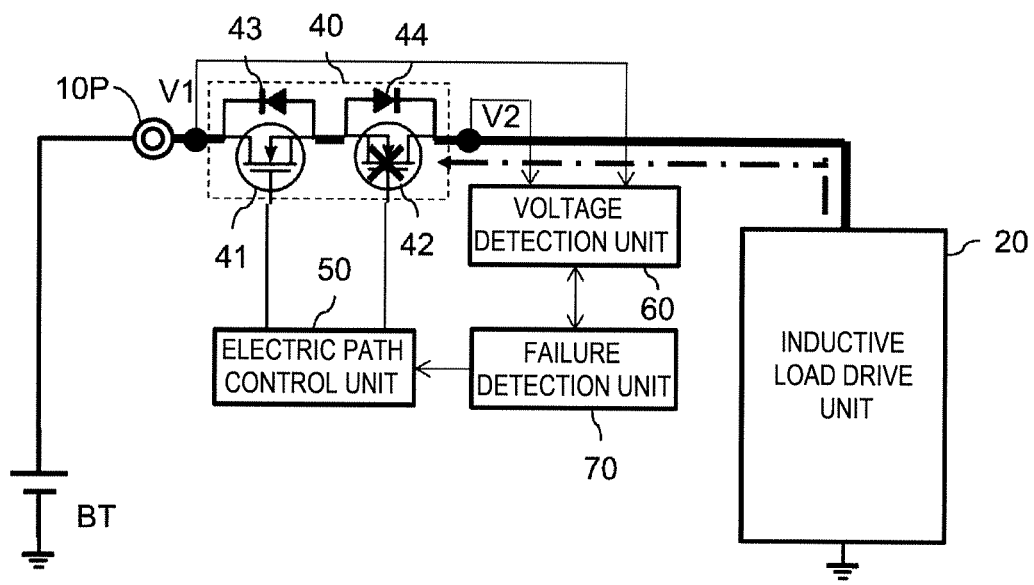
FIG. 5A is an explanatory diagram illustrating the flow of the current and FIG. 5B is an explanatory diagram illustrating a relationship between the first voltage and the second voltage, in a case where the non-conduction failure occurs in the reverse connection prevention FET when the regenerative current flows, in the inductive load control device according to the first embodiment of the present invention.

On the other hand, FIG. 5A illustrates a state when a regenerative current is about to flow from the inductive load drive unit 20 side to the DC power supply BT when the electric path control unit 50 controls the power shutoff FET 41 and the reverse connection prevention FET 42 to be turned on, in a case where the non-conduction failure occurs in the reverse connection prevention FET 42. Since the non-conduction failure occurs in the reverse connection prevention FET 42, the reverse connection prevention FET 42 remains off without being turned on even if the electric path control unit 50 controls the reverse connection prevention FET 42 to be turned on. Also, since the reverse connection prevention FET parasitic diode 44 is in the opposite direction to the direction of the current, the regenerative current stops at the FET parasitic diode 44 for reverse connection prevention and thus, the regenerative current basically does not flow. However, due to the counter electromotive force generated in the motor MT, a counter electromotive voltage of a high voltage is generated for a short time. The time and magnitude of generation of the counter electromotive voltage depend on a resistor one end of which is connected between the reverse connection prevention FET 42 and the bridge circuit 20 and the other end of which is grounded and capacitance. A capacitor (not illustrated) having large capacitance is mounted for smoothing in many cases, and in this case, the time and magnitude of generation of the counter electromotive voltage depends largely on this capacity.

Figure 5B:
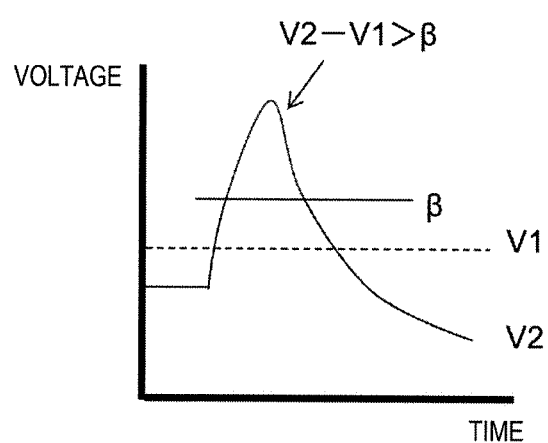

In such a state, that is, when a regenerative current is about to flow from the inductive load drive unit 20 side to the DC power supply BT in a case where the non-conduction failure occurs in the reverse connection prevention FET 42, the relationship between the first voltage V1 and the second voltage V2 becomes as illustrated in FIG. 5B when comparing the first voltage V1 and the second voltage V2. That is, although the second voltage V2 is lower than the first voltage V1 before the counter electromotive force is generated, the second voltage V2 becomes a high voltage higher than the first voltage V1 when the counter electromotive force is generated, and then is discharged and attenuated, so that the second voltage V2 becomes lower than the first voltage V1 again. A second threshold value $\beta$ which is smaller than the generated counter electromotive voltage and is larger than a value obtained by adding the voltage drop between the drain and the source of the power shutoff FET 41 and the forward voltage drop of the reverse connection prevention FET parasitic diode 44 is set. As illustrated in FIGS. 4A and 4B, when the electric path opening and closing unit 40 is operating normally, it becomes that $$V2-V1<\beta \quad (3).$$

As illustrated in FIGS. 5A and 5B, in a case where the non-conduction failure occurs in the reverse connection prevention FET 42, it becomes that $$V2-V1>\beta \quad (4).$$

The second threshold value $\beta$ may be set based on the voltage generated at the other end of the electric path opening and closing unit 40 of the inductive load drive unit 20 side, where the voltage generated at the other end of the electric path opening and closing unit 40 depends on the voltage generated by the motor MT which is an inductive load when a regenerative current is about to flow from the inductive load drive unit 20 side to the DC power supply BT in a case where the non-conduction failure occurs in the reverse connection prevention FET 42.

As such, in the inductive load control device 100 in which the bridge circuit 20 is configured with the plurality of switching elements disposed so that the regenerative current flows from the inductive load side to the direct current power supply BT, when the electric path control unit 50 performs control to make the power shutoff FET 41 and the reverse connection prevention FET 42 conductive based on the command signal from the failure detection unit 70, the voltage detection unit 60 detects the voltage difference (V2−V1, second voltage difference) between the first voltage V1 and the second voltage V2. In a case where the voltage difference (V2−V1, second voltage difference) is larger than the second threshold value $\beta$ of the value of the high voltage that is appropriately set in advance by an experiment or the like, the failure detection unit 70 detects the reverse connection prevention FET 42 is in a non-conduction failure. By detecting in this way, it is possible to detect a non-conduction failure of the reverse connection prevention FET 42 (switching element for reverse contact protection) when a regenerative current flows. Matters that the bridge circuit 20 includes the plurality of switching elements disposed so that a regenerative current flows from the inductive load side to the DC power supply BT means that, for example, anodes of the diodes disposed in parallel with the high potential side switching elements Quh, Qvh, and Qwh configuring the bridge circuit 20 are connected to the motor MT side and the cathodes thereof are connected to the DC voltage side, and furthermore, anodes of the diodes disposed in parallel with the low potential side switching elements Qul, Qvl, and Qwl configuring the bridge circuit 20 are connected to the ground side and cathodes thereof are connected to the motor MT side.

Figure 8:
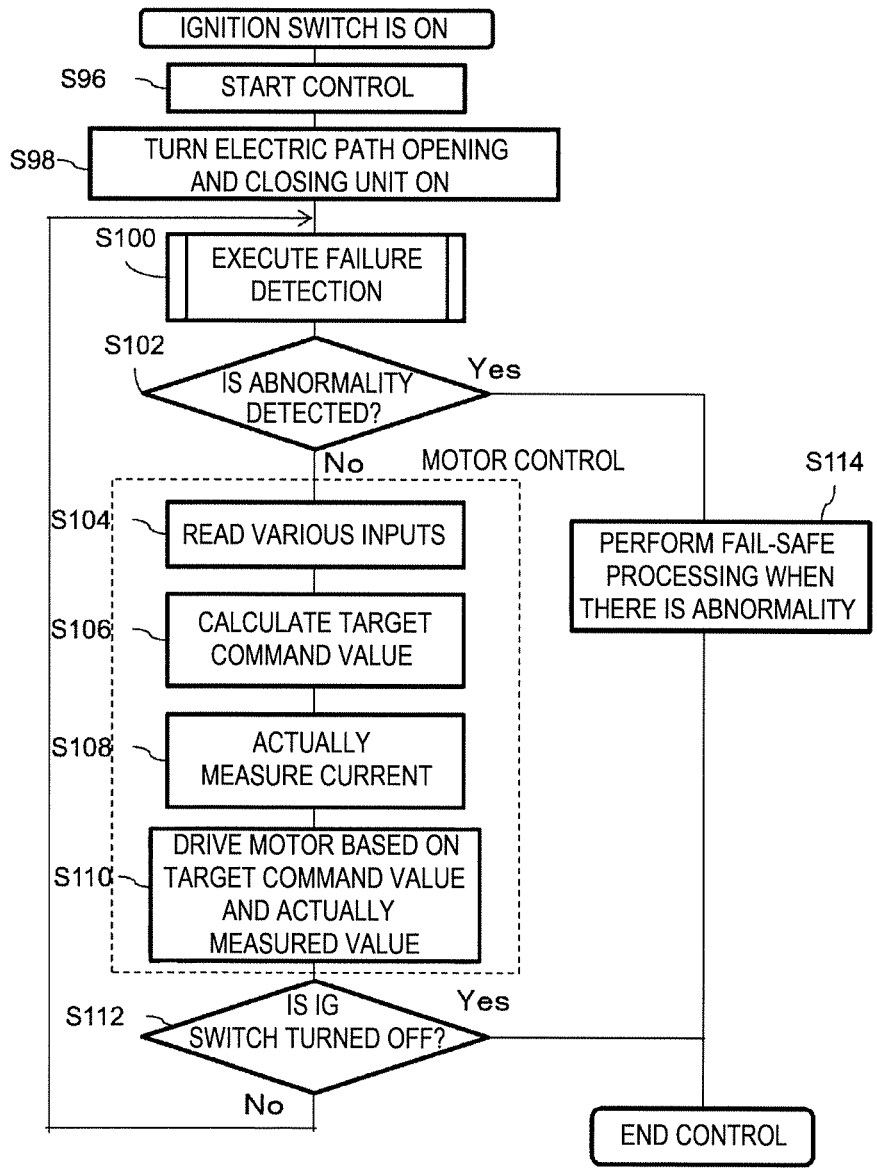
FIG. 8 is a flowchart illustrating a control method in the inductive load control device according to the first embodiment of the present invention.

A control method and a failure detection method in the inductive load control device 100 will be described with reference to FIGS. 8 and 9. The letter S in the flowchart indicates a step. In S96, when the ignition switch IG of the vehicle is turned on, electric power is supplied to each unit and operation is started, in the inductive load control device 100. In the inductive load control device 100, firstly, in S98, the failure detection unit 70 turns on the electric path opening and closing unit 40 to execute failure detection which will be described later. In a case where the failure detection unit 70 detects an abnormality when the electric path opening and closing unit 40 is turned on, the failure detection unit 70 executes fail-safe processing, for example, processing such as prohibiting drive of the motor. In a case where the failure detection unit 70 does not detect an abnormality, the electric path opening and closing unit 40 is made conductive, and the inductive load drive control unit 80 calculates a target command value that is a current to be supplied to the motor MT based on a steering torque value read from the outside and a rotation angle of the motor MT. Furthermore, the inductive load drive control unit 80 calculates an actually measured value flowing to the motor MT from the voltage read from the shunt resistor. Then, the inductive load drive control unit 80 feeds the actual measurement value back to the motor control, adjusts the current flowing to the motor MT, and then drives the motor MT by the PWM. Until the ignition switch IG is turned off, this series of control is repeated at a predetermined control cycle. When the ignition switch IG is turned off, the inductive load control device 100 stops the control.

Figure 9:
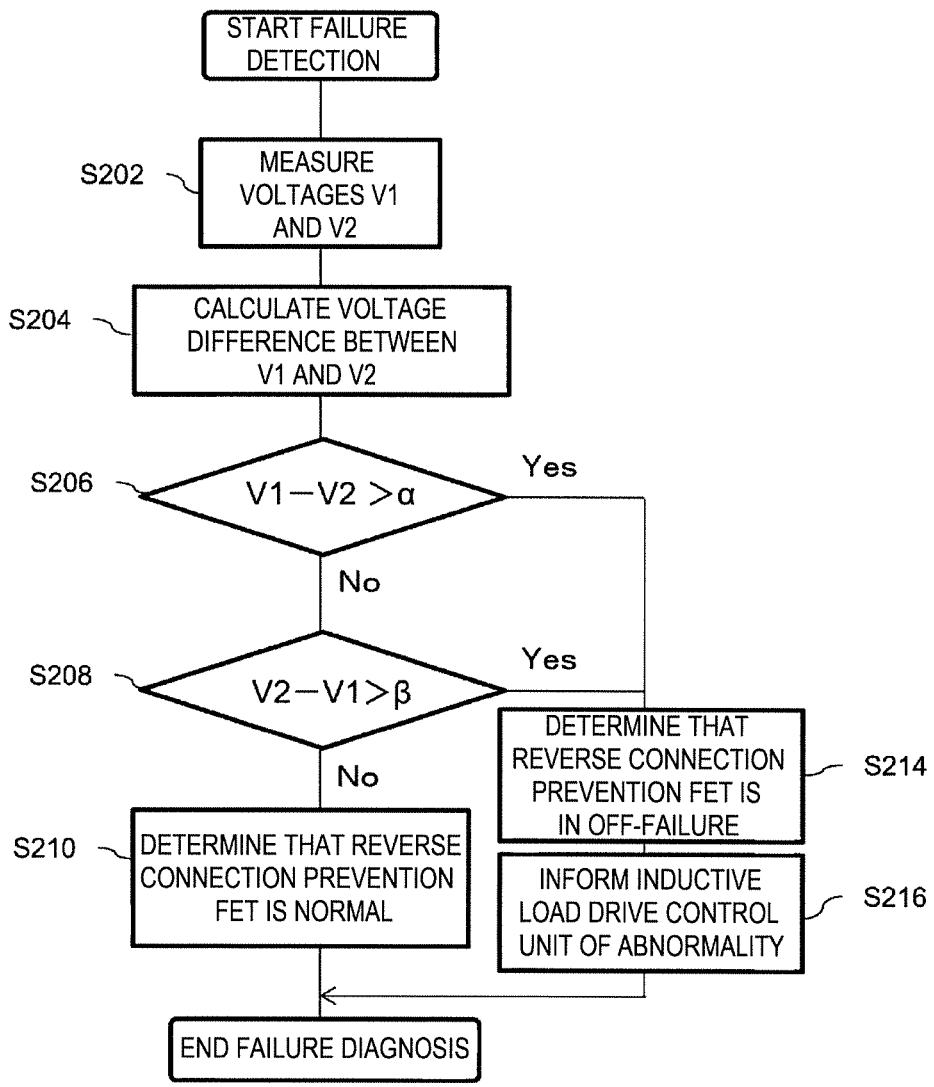
FIG. 9 is a flowchart illustrating a failure detection method in the inductive load control device according to the first embodiment of the present invention.

The inductive load control device 100 executes failure detection illustrated in FIG. 9 in S100. In S102, the inductive load control device 100 checks whether an abnormality is detected in failure detection. With reference to FIG. 9, a failure detection method will be described. The voltage detection unit 60 measures the first voltage V1 and the second voltage V2 in S202 and calculates the voltage difference between the first voltage V1 and the second voltage V2 in S204. In step S206, the failure detection unit 70 checks whether the expression (2) is satisfied. In a case where the expression (2) is satisfied, the failure detection unit 70 determines that the reverse connection prevention FET 42 is in an off-failure, in S214. In step S216, the failure detection unit 70 informs the inductive load drive control unit 80.

In a case where the expression (2) is not satisfied, that is, when the electric path control unit 50 performs control to make the power shutoff FET 41 and the reverse connection prevention FET 42 conductive, the voltage detection unit 60 detects the voltage difference (V1–V2, first voltage difference) between the first voltage V1 and the second voltage V2, and in a case where it is detected that the reverse connection prevention FET 42 is not in a non-conduction failure, the failure detection unit 70 checks whether or not the expression (4) is satisfied, in S208. When the expression (4) is satisfied, in step S214, the failure detection unit 70 determines that the reverse connection prevention FET 42 is in an off-failure, and informs the inductive load drive control unit 80 in step S216. In this embodiment, the check performed in S208 is executed at each control cycle, but may be performed according to the timing of the PWM control which is a combination of ON and off of each drive semiconductor switching element which causes a path through which the regenerative current flows to the DC power supply.

In a case where the expression (4) is not satisfied, that is, when the electric path control unit 50 performs control to make the power shutoff FET 41 and the reverse connection prevention FET 42 conductive, the voltage detection unit 60 detects the voltage difference (V2–V1, second voltage difference) between the first voltage V1 and the second voltage V2, and in a case where it is detected that the reverse connection prevention FET 42 is not in a non-conduction failure, the failure detection unit 70 determines in S210 that the reverse connection prevention FET 42 is normal. By adding matters that a state satisfying the expression continues for a predetermined time to the requirement, it may be determined that the reverse connection prevention FET 42 is in an off-failure, in the determination of S206 or S208.

By performing the failure detection in this way, when the DC power supply BT is connected and the electric path 30 is made conductive, or when a regenerative current flows, the non-conduction failure of the reverse connection prevention FET 42 (reverse connection protection switching element) can be detected.

In a case where the failure detection unit 70 informs the inductive load drive control unit 80 that there is an abnormality, in step S114, fail-safe processing when there is an abnormality is performed. For example, an indicator such as urging a driver to perform maintenance inspection is turned on, or driving of the motor MT is stopped. The inductive load control device 100 then ends the control.

In a case where no abnormality is detected, the inductive load control device 100 performs drive control of the motor MT. More specifically, the inductive load drive control unit 80 reads a signal obtained from a sensor or an ECU in S104, and calculates a target command value of a duty ratio to be output to the pre-driver unit 90 in S106. The inductive load drive control unit 80 actually measures the current flowing in each phase of the bridge circuit 20 and the like and acquires the current the like in S108, and causes the pre-driver unit 90 to output a PWM signal for driving the motor MT based on the target command value and the actually measured value to drive the motor MT in S110. In S112, the inductive load control device 100 checks whether or not the ignition switch IG is turned off. When the ignition switch IG is kept on, the inductive load control device 100 repeats S100 to S110 and always performs failure detection. When the ignition switch IG is turned off, the control is ended.

One or more embodiments of the present invention are not limited to the illustrated embodiment, and can be implemented with configurations within the scope without departing from contents described in the respective claims. That is, while the present invention has been particularly illustrated and described with reference to particular embodiments thereof, it will be apparent to those skilled in the art that various changes, substitutions and alterations can be made to the embodiments described above without departing from the spirit and scope of the present invention.

In the embodiment, the voltage difference between the first voltage V1 and the second voltage V2 is used, but it suffices to compare the first voltage V1 and the second voltage V2. For example, comparison of a voltage difference between a value obtained by adding a predetermined value to the first voltage V1 and the second voltage V2 with a threshold value and the like are also within the scope of the present invention. The predetermined value is a value obtained by adding the voltage drop between the drain and the source of the power shutoff FET 41 and the forward voltage drop of the reverse connection prevention FET parasitic diode 44 or a value obtained by adding the voltage drop between the drain and the source of the power shutoff FET 41 and the forward voltage drop of the reverse connection prevention FET parasitic diode 44. A ratio between the first voltage V1 and the second voltage V2, or the like may be used.

In the case of this embodiment, since the switching element is an FET, the voltage drop is the voltage difference between the drain and the source, but a relay can be used as the switching element. The voltage drop in this case is a voltage difference between two contact points of the relay.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An inductive load control device comprising:
   an electric path configured to connect an external DC power supply and an inductive load drive unit, the inductive load drive unit configured to supply a current from the DC power supply to an inductive load and drive the inductive load;
   an electric path opening and closing unit which is provided in the electric path and is configured to connect or disconnect the electric path;
   an electric path control unit configured to control opening and closing of the electric path opening and closing unit;
   a voltage detection unit configured to detect a voltage difference between a first voltage at one end of the electric path opening and closing unit on a DC power supply side and a second voltage at an other end of the electric path opening and closing unit on an inductive load drive unit side; and
   a failure detection unit configured to detect a failure of the electric path opening and closing unit,
   wherein the electric path opening and closing unit comprises:
      a first switching element;
      a second switching element connected in series with the first switching element; and
      a diode connected in series with the first switching element and connected in parallel with the second switching element such that an anode of the diode is disposed in a direction of the DC power supply, and
   wherein the failure detection unit is configured to detect that the second switching element is in a non-conduction failure, based on the voltage difference.

2. The inductive load control device according to claim 1, wherein the voltage detection unit is configured to detect a first voltage difference between the first voltage and the second voltage when the electric path control unit performs control to make the first switching element and the second switching element conductive, and
   wherein the failure detection unit is configured to detect that the second switching element is in a non-conduction failure in a case where the first voltage difference is larger than a predetermined first threshold value.

3. The inductive load control device according to claim 2, wherein the first threshold value is larger than a value obtained by adding a voltage drop of the first switching element and a voltage drop of the second switching element, and is smaller than a value obtained by adding the voltage drop of the first switching element and a forward voltage drop of the diode.

4. The inductive load control device according to claim 1, wherein the inductive load drive unit is a bridge circuit comprising a plurality of switching elements disposed to allow a regenerative current to flow from the inductive load side to the DC power supply,
   wherein the voltage detection unit is configured to detect a second voltage difference between the first voltage and the second voltage when the electric path control unit performs control to drive the inductive load drive unit by making the first switching element and the second switching element conductive, and
   wherein the failure detection unit is configured to detect that the second switching element is in a non-conduction failure in a case where the second voltage difference is larger than a predetermined second threshold value.

5. The inductive load control device according to claim 4, wherein the second threshold value is set based on a voltage generated at the other end of the electric path opening and closing unit on the inductive load drive unit side, the voltage generated at the other end depending on a voltage generated by the inductive load in a case where the regenerative current does not flow to the DC power supply through the second switching element due to the non-conduction failure of the second switching element.

6. An inductive load control device comprising:
   a power supply terminal connected to an external DC power supply;
   an inductive load drive unit configured to supply a current to an inductive load and drive the inductive load;
   an electric path configured to connect the power supply terminal and the inductive load drive unit;
   an electric path opening and closing unit which is provided in the electric path and is configured to connect or disconnect the electric path;
   an electric path control unit configured to control opening and closing of the electric path opening and closing unit;
   a voltage detection unit configured to detect a voltage difference between a first voltage that is a voltage between the electric path opening and closing unit and the power supply terminal and a second voltage that is a voltage between the electric path opening and closing unit and the inductive load drive unit; and
   a failure detection unit configured to detect a failure of the electric path opening and closing unit,
   wherein the electric path opening and closing unit comprises:
      a first switching element;
      a second switching element connected in series with the first switching element; and
      a diode connected in series with the first switching element and connected in parallel with the second switching element such that an anode of the diode is disposed in a direction of the power supply terminal, and
   wherein the failure detection unit is configured to detect that the second switching element is in a non-conduction failure, based on the voltage difference.

7. The inductive load control device according to claim 6, wherein the voltage detection unit is configured to detect a first voltage difference between the first voltage and the second voltage when the electric path control unit performs control to make the first switching element and the second switching element conductive, and
   wherein the failure detection unit is configured to detect that the second switching element is in a non-conduction failure in a case where the first voltage difference is larger than a predetermined first threshold value.

8. The inductive load control device according to claim 7, wherein the first threshold value is larger than a value obtained by adding a voltage drop of the first switching element and a voltage drop of the second switching element, and is smaller than a value obtained by adding the voltage drop of the first switching element and a forward voltage drop of the diode.

9. The inductive load control device according to claim 6, wherein the inductive load drive unit is a bridge circuit comprising a plurality of switching elements disposed to allow a regenerative current to flow from the inductive load side to the DC power supply, wherein the voltage detection unit is configured to detect a second voltage difference between the first voltage and the second voltage when the electric path control unit performs control to drive the inductive load drive unit by making the first switching element and the second switching element conductive, and wherein the failure detection unit is configured to detect that the second switching element is in a non-conduction failure in a case where the second voltage difference is larger than a predetermined second threshold value.

10. The inductive load control device according to claim 9, wherein the second threshold value is set based on a voltage generated at the other end of the electric path opening and closing unit on the inductive load drive unit side, the voltage generated at the other end depending on a voltage generated by the inductive load in a case where the regenerative current does not flow to the DC power supply through the second switching element due to the non-conduction failure of the second switching element.

* * * * *